US006996992B2

(12) United States Patent
Jeske et al.

(10) Patent No.: US 6,996,992 B2
(45) Date of Patent: Feb. 14, 2006

(54) GAS COLLECTION PIPE CARRYING HOT GAS

(75) Inventors: Hans-O. Jeske, Wesel (DE); Klaus Mohr, Wuppertal (DE)

(73) Assignee: Man Turbo AG, Oberhausen (DE)

( * ) Notice: Subject to any disclaimer, the term of this patent is extended or adjusted under 35 U.S.C. 154(b) by 102 days.

(21) Appl. No.: 10/390,407

(22) Filed: Mar. 17, 2003

(65) Prior Publication Data

US 2004/0035116 A1 Feb. 26, 2004

(30) Foreign Application Priority Data

Aug. 23, 2002 (DE) ................................ 102 39 534

(51) Int. Cl.
*F02C 3/04* (2006.01)

(52) U.S. Cl. ........................ 60/805; 60/39.37; 415/116

(58) Field of Classification Search .................. 60/805, 60/806, 39.37, 39.75, 753; 415/116, 178, 415/176, 177, 183, 185, 208.2
See application file for complete search history.

(56) References Cited

U.S. PATENT DOCUMENTS

| | | | | |
|---|---|---|---|---|
| 2,526,281 | A * | 10/1950 | Ryan et al. | 415/77 |
| 5,274,991 | A * | 1/1994 | Fitts | 60/800 |
| 5,426,943 | A | 6/1995 | Althaus et al. | |
| 5,761,898 | A * | 6/1998 | Barnes et al. | 60/799 |
| 6,018,950 | A * | 2/2000 | Moeller | 60/752 |
| 6,134,877 | A * | 10/2000 | Alkabie | 60/800 |
| 6,148,604 | A * | 11/2000 | Salt et al. | 60/797 |
| 6,196,793 | B1 * | 3/2001 | Braaten | 415/191 |
| 6,226,978 | B1 * | 5/2001 | Chandra et al. | 60/805 |
| 6,568,902 | B1 * | 5/2003 | Aschenbruck et al. | 415/116 |
| 6,571,560 | B1 * | 6/2003 | Tatsumi et al. | 60/753 |
| 6,675,584 | B1 * | 1/2004 | Hollis et al. | 60/796 |
| 2002/0004003 | A1 | 1/2002 | Aschenbruck et al. | |
| 2002/0078691 | A1 | 6/2002 | Hoecker | |

FOREIGN PATENT DOCUMENTS

| | | |
|---|---|---|
| CH | 599 458 | 5/1978 |
| DE | 41 42 413 | 5/1993 |
| DE | 42 42 721 | 6/1994 |
| DE | 198 15 473 | 10/1999 |
| DE | 100 32 454 | 1/2002 |
| DE | 100 32 454 A1 | 1/2002 |
| EP | 0 123 101 | 10/1984 |
| GB | 624285 | 6/1947 |
| GB | 2 261 281 | 5/1993 |
| GB | 2 361 302 A | 10/2001 |
| JP | 62131927 | 6/1987 |
| JP | 10026022 | 1/1998 |

* cited by examiner

*Primary Examiner*—William H. Rodriguez
(74) *Attorney, Agent, or Firm*—McGlew and Tuttle, PC

(57) ABSTRACT

A gas collection pipe (1) carrying hot gas establishes the connection between the combustion chambers (9) of a gas turbine plant and the flow channel (13) of the gas turbine. The gas collection pipe (1) has two inlet pipe connections (2), which open via an elbow (3) axially into a gas ring channel (4), which is joined to the flow channel (13). Cooling air is guided on the outside along the elbow (3). A plurality of ribs (8) are arranged at spaced locations from one another on the outside on the gas collection pipe (1) in the area of the elbow (3) on the side facing away from the flow channel (13).

7 Claims, 4 Drawing Sheets

GAS COLLECTION PIPE CARRYING HOT GAS

FIELD OF THE INVENTION

The present invention pertains to a gas collection pipe carrying hot gas for connection between the combustion chambers of a gas turbine plant and a flow channel of the gas turbine.

BACKGROUND OF THE INVENTION

A two-armed gas collection pipe of this type, also called bifurcated pipe, has been known from DE 198 15 473 A1. Due to the special shape of the inlet pipe connection of this gas collection pipe, the middle areas are subject to substantially higher thermal load than the upper area and the lower area in its outlet cross section formed by the gas ring channel.

The gas ring channel of the gas collection pipe is cooled to the extent that cooling air is led along the gas ring channel on the outside. This cooling air is taken from the compressor of the gas turbine plant. Two ring flanges, which are provided with slots for the passage of the cooling air into the flow channel of the gas turbine, are provided at the edges of the gas ring channel. In a gas collection pipe known from DE 100 32 454 A1, the cross sections of the slots are distributed nonuniformly over the circumference of the ring flange such that a larger amount of cooling air is carried along at the areas of the gas collection pipe that are subject to a higher thermal load than at the areas that are subject to a lower thermal load. As a result, uniform cooling of the gas ring channel of the gas collection pipe is achieved due to the nonuniform amount of cooling air.

SUMMARY OF THE INVENTION

The basic object of the present invention is to design the gas collection pipe of this type such that the guiding of the cooling air known from DE 100 32 454 A1 is achieved with other means with a simultaneous intensification of the cooling.

The object is accomplished according to the present invention in a gas collection pipe carrying hot gas for connection between combustion chambers of a gas turbine plant and the flow channel of the gas turbine, wherein the gas collection pipe has two inlet pipe connections. The inlet pipe connections open via an elbow axially into a gas ring channel, which is joined to the flow channel. Cooling air is led along the elbow on the outside. A plurality of ribs are arranged at spaced locations from one another on the outside on the gas collection pipe, in the area of the elbow, on the side facing away from the flow channel.

The ribs are placed in the gas collection pipe according to the present invention such that they deflect the cooling air stream directed toward the gas collection pipe and direct it preferably toward the middle area of the gas collection pipe, which is subject to the highest thermal load. Moreover, the surface of the area subject to the higher thermal load, where better removal of heat is achieved, is enlarged by the ribs.

As is known from DE 100 32 454 A1, the amount of cooling air as a whole is not increased during the cooling of the gas collection pipe. The cooling air, which normally cools areas that have only a low temperature load, is only led to the areas that are subject to a higher thermal load. As a result, the material temperature of the outlet cross section increases in the cold zones. However, the temperatures drop in the two hot zones, so that a nearly uniform temperature profile is obtained over the circumference.

The advantages arising from the measures according to the present invention are a reduction of the local, service life-limiting material temperature, an evening out of the temperature distribution, a reduction of temperature stresses, an improvement in the temperature stability and corrosion resistance and an increase in the service life of the gas collection pipe.

Another advantage is that no increased cooling air demand is necessary. Additional cooling air is usually sent to hot zones according to the methods known and used hitherto to counter temperature peaks in components exposed to high temperatures. However, this additional cooling air is usually not available, or it leads to a reduction in the efficiency of the machine.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 4:
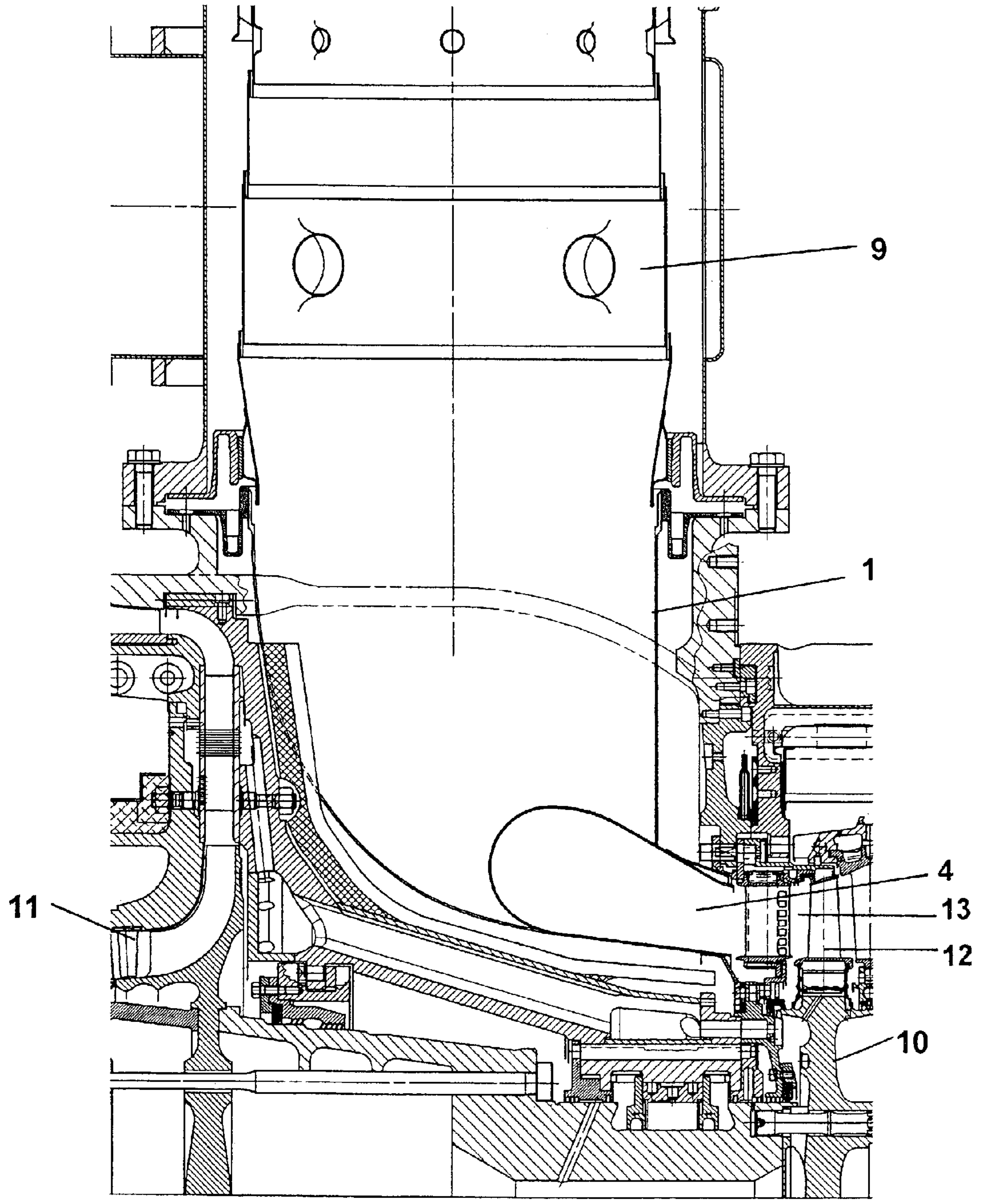
FIG. 4 is a detail from a gas turbine plant as a half-section through the transition between the compressor part and the turbine part of the gas turbine plant.

Referring to the drawings in particular, FIG. 4 shows a gas turbine plant to the extent as necessary for the understanding of the present invention. The gas turbine plant is known per se and comprises a compressor, a gas turbine and, in this case, two outer combustion chambers 9 in a V-shaped arrangement. Only one of the combustion chambers 9 can be recognized in the view in FIG. 4. The gas turbine contains a rotor disk 10, which carries rotor blades 12, which are located within the ring-shaped flow channel 13 of the gas turbine. The flow channel 13 is joined by a gas ring channel 4 acting as a gas collection space. Only the compressor blading 11 of the compressor rotor can be recognized from the compressor of the gas turbine plant in FIG. 4.

Figure 1:
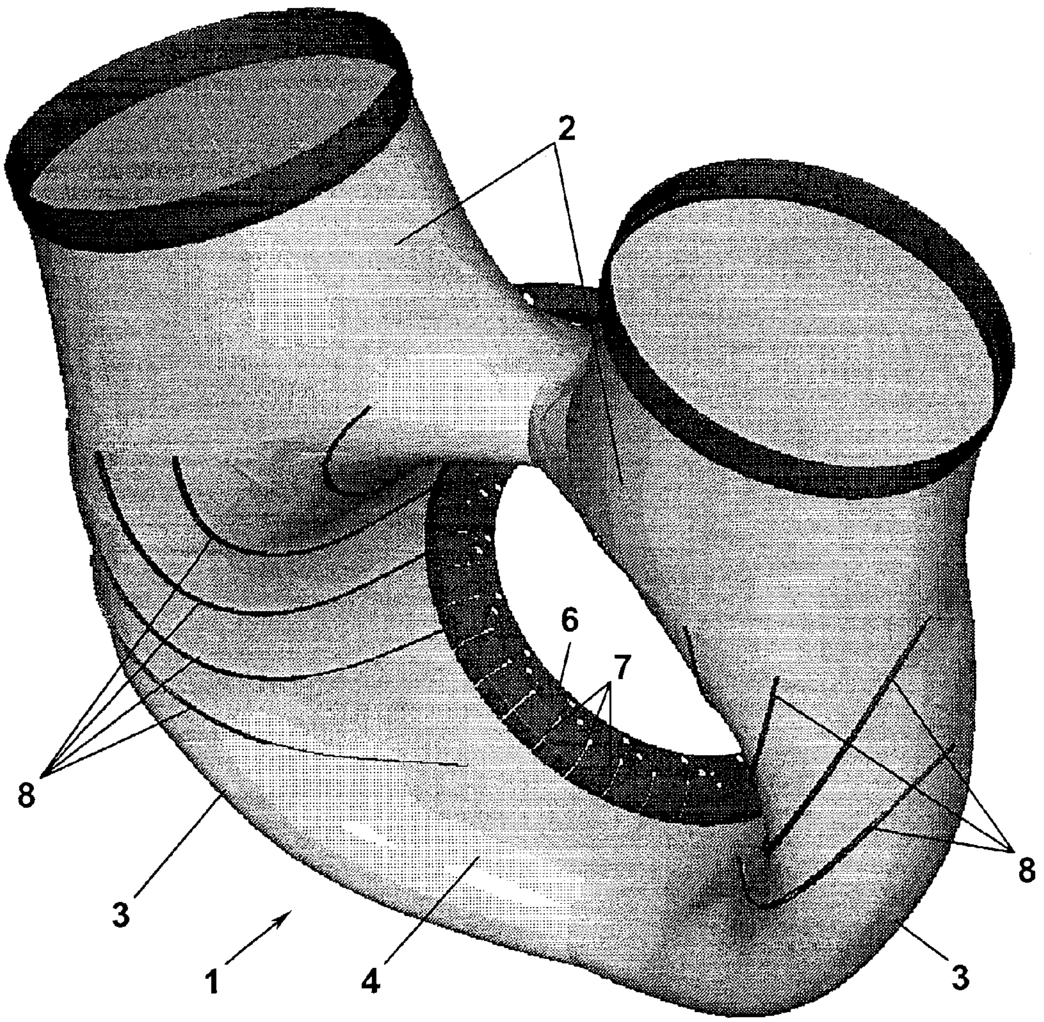
FIG. 1 is a perspective view of a gas collection pipe according to the present invention when viewed obliquely from the top from the oncoming flow side.
Figure 2:
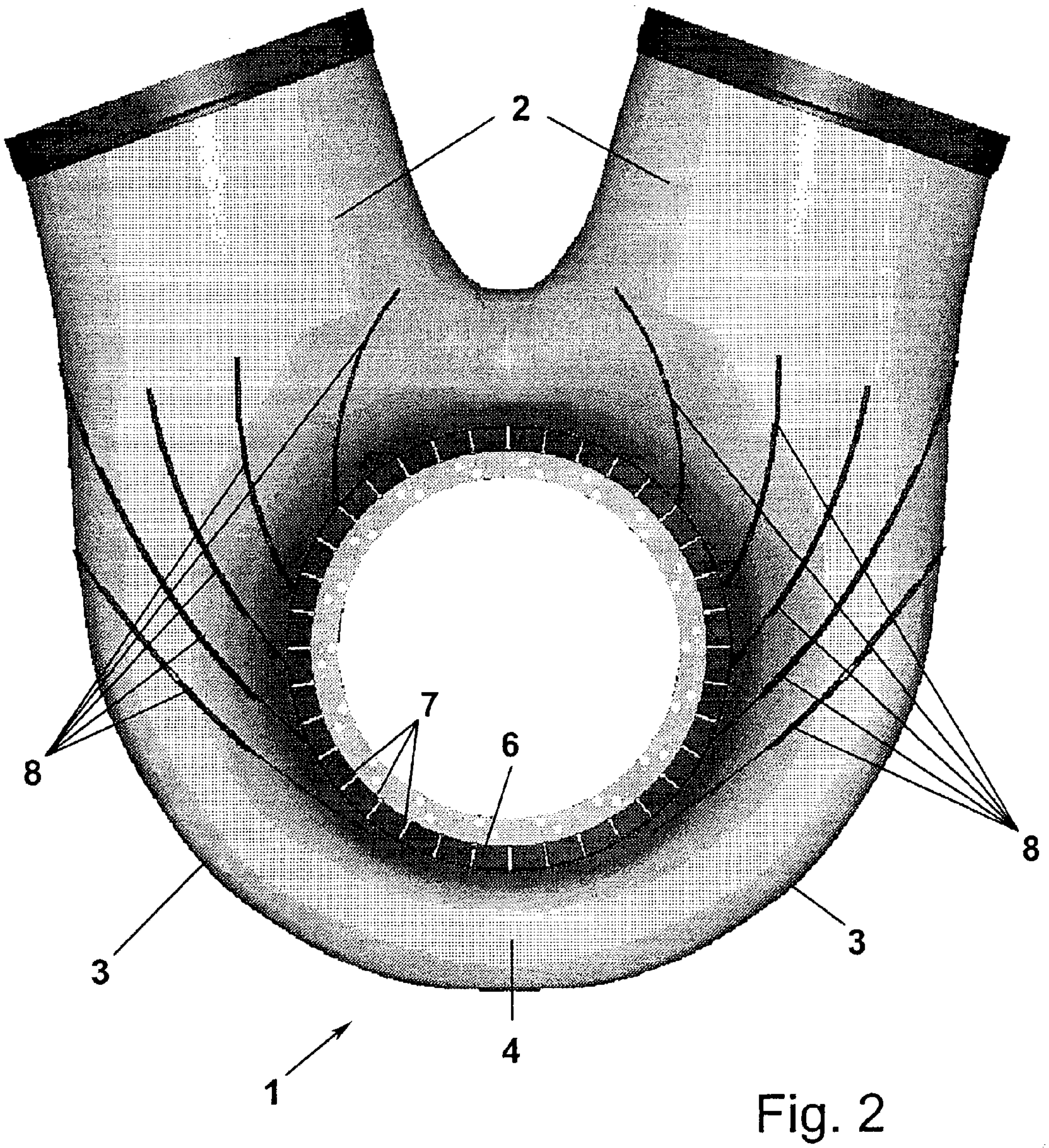
FIG. 2 is a perspective view of a gas collection pipe according to the present invention when viewed from the oncoming flow side.
Figure 3:
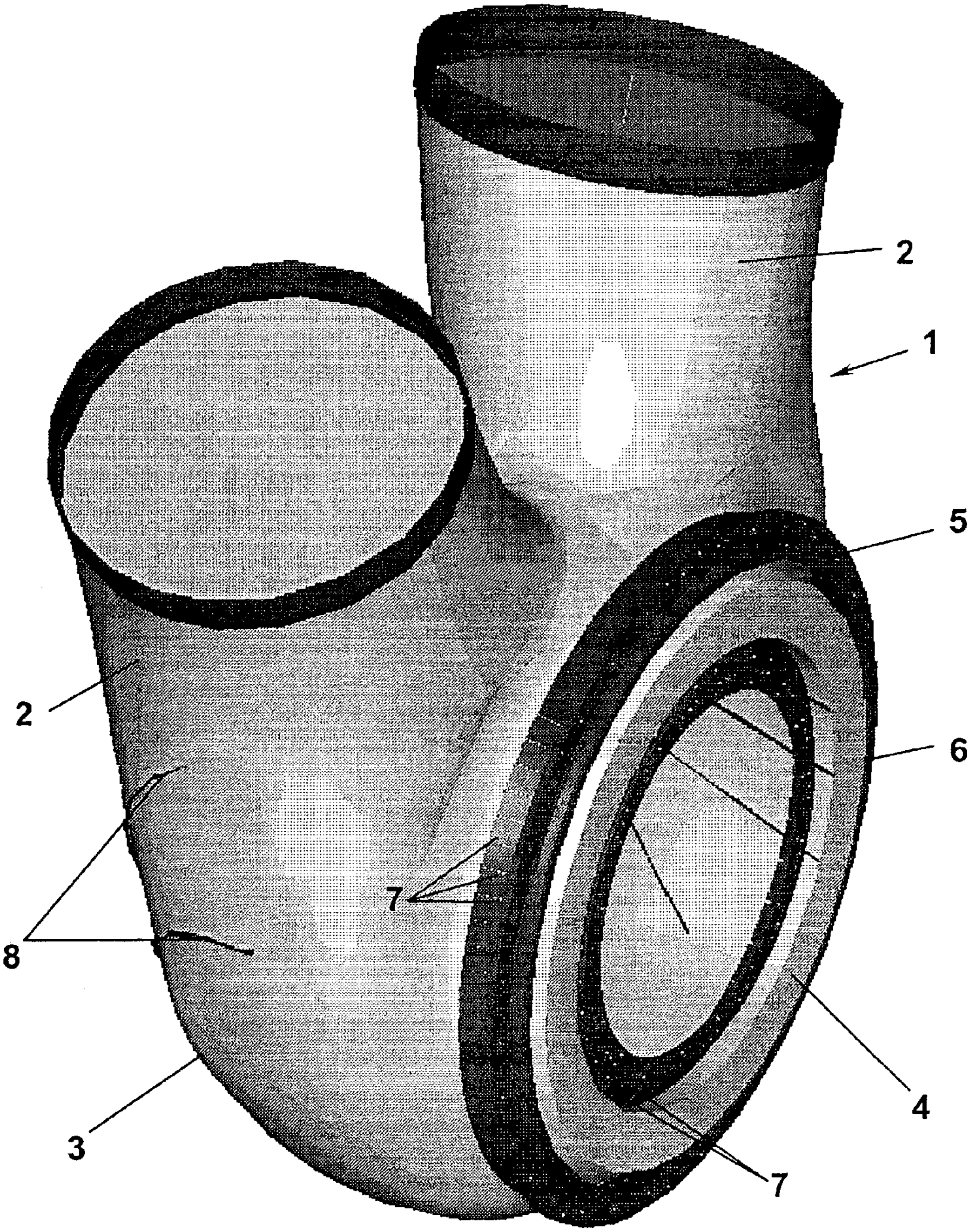
FIG. 3 is a perspective view of a gas collection pipe according to the present invention when viewed obliquely from the side.

The connection between the two combustion chambers 9 of the gas turbine plant and the flow channel 13 of the gas turbine is established via a two-armed gas collection pipe 1 carrying hot gas, which is shown in greater detail in FIGS. 1 through 3. The gas collection pipe 1 is provided with two inlet pipe connections 2, which are connected each to the gas outlet of one of the combustion chambers 9. The inlet pipe connections 2 open via a 90° elbow 3 into a gas ring channel 4 used as a gas collection space in the lower part of the gas collection pipe 1. The gas collection pipe 1 is provided with an outer ring flange 5 and an inner ring flange 6, which are joined to corresponding opposing flanges of the housing of the gas turbine. The compressed hot gas flows from the combustion chambers 9 through the inlet pipe connections 2 of the gas collection pipe 1 and is united and collected in the gas ring channel 4 before it flows into the flow channel 13 and sets the turbine rotor 10 with the rotor blades 12 into rotation.

Due to the design of the inlet pipe connections 2, the gas ring channel 4 of the gas collection pipe 1 is subjected to nonuniform thermal load by the hot gas being carried. The middle areas, which correspond to the 3 o'clock and 9 o'clock positions, are subject to a higher load than the upper and lower areas of the gas ring channel 4 corresponding to the 6 o'clock and 12 o'clock positions.

The entire gas collection pipe 1 is cooled by convection on the outside by compressor air, which is taken from the compressor of the gas turbine plant. This cooling air is led on the outside along the elbow 3 and, adjoining it, along the gas ring channel 4. Slots 7 or other openings are provided for this purpose in the outer and inner ring flanges 5, 6, which protrude as rings into the path of flow of the cooling air. The cooling air flows off through these slots 7. The driving force for the flow of the cooling air is a pressure difference, which builds up on both sides of the slotted ring flanges 5, 6.

To guide the cooling air, a plurality of ribs 8 are arranged at spaced locations from one another, e.g., by spot welding, on the gas collection pipe 1 on the outside in the area of the elbow 3 on the side facing away from the inlet flange of the gas turbine. These ribs 8 are led into the inlet pipe connection 2 up to and into the middle area of the gas ring channel 4 along the elbow 3 beginning from the transition area both on the inner side and on the outer side of the gas ring channel. The ribs 8 thus arranged guide the cooling air, which arrives in a more or less directed manner, to the hottest areas of the gas collection pipe 1 in order to cool these especially strongly. At the same time, the surface to be cooled is enlarged by the ribs, as a result of which the cooling is further intensified.

The ribs 8 extend in the radial direction over the area near the wall. The height of the ribs 8 depends on the size of the gas turbine. If the height of the gas ring channel 4 is about 70 mm, the height of the ribs 8 is about 5 mm to 10 mm.

While a specific embodiment of the invention has been shown and described in detail to illustrate the application of the principles of the invention, it will be understood that the invention may be embodied otherwise without departing from such principles.

What is claimed is:

1. A gas collection pipe carrying hot gas for connection between combustion chambers of a gas turbine plant and a flow channel of a gas turbine, the gas collection pipe comprising:

two inlet pipe connections opening axially via an elbow into a gas ring channel joined to the flow channel; and a plurality of ribs arranged at spaced locations from one another on an outside surface of the gas collection pipe in an area of said elbow on a side of the gas collection pipe facing away from the flow channel, wherein cooling air is led by the ribs along the elbow on the outside surface of the gas collection pipe, wherein the ribs are led along the elbow beginning from a transition area into the inlet pipe connection up to and into a middle area of the gas ring channel on an inner side and on an outer side of the gas ring channel.

2. A gas collection pipe in accordance with claim 1, wherein the height of the ribs is about 10% of a height of the gas ring channel.

3. A gas turbine plant arrangement comprising:

combustion chambers;

a gas turbine with a flow channel;

a gas collection pipe carrying hot gas between said combustion chambers and said flow channel and including two inlet pipe connections to the respective combustion chambers, said inlet pipe connections opening axially via an elbow into a gas ring channel joined to said flow channel; and a plurality of ribs arranged at spaced locations from one another on an outer surface of said gas collection pipe in an area of said elbow on a side of said gas collection pipe facing away from said flow channel, the ribs and the outer surface of the gas collection pipe defining surfaces of a cooling air channel with cooling air being led along said gas collection pipe, wherein said height of said ribs is about 10% of a height of said gas ring channel.

4. A gas turbine plant arrangement in accordance with claim 3, wherein said ribs are led along said elbow beginning from a transition area into said inlet pipe connection up to and into a middle area of said gas ring channel on an inner side and on an outer side of said gas ring channel.

5. A gas turbine plant arrangement comprising:

a first combustion chamber;

a second combustion chamber;

a gas turbine with a flow channel;

a compressor driven by said gas turbine, said compressor providing a supply of cooling air;

a gas collection pipe carrying hot gas between said combustion chambers and said flow channel, said gas collection pipe having a hot medium side carrying the hot gas and having a cooling medium side and including a first inlet pipe connected to said first combustion chamber and a second inlet pipe connected to said second combustion chamber, a gas ring channel having an annular discharge side, said gas ring channel being joined to said flow channel of said gas turbine and an elbow structure carrying the hot gas from said first combustion chamber and said second combustion chamber to said gas ring channel, said elbow structure having an end area adjacent to and between said first inlet pipe and said second inlet pipe and an opposite end area and having a first side middle area and a second side middle area, said end areas being exposed to a lower thermal load than said middle areas;

a cooling air discharge directing cooling air from said compressor adjacent to said gas ring channel over said cooling medium side of said gas ring channel and said elbow;

a plurality of ribs arranged at spaced locations from one another only on said cooling medium side of said gas collection pipe in an area of said elbow on said cooling medium facing away from said discharge side, the ribs and the outer surface of the gas collection pipe defining surfaces of a cooling air path directing cooling air along a length of said middle areas of said cooling medium side.

6. A gas turbine plant arrangement in accordance with claim 5, wherein said ribs include a first set of ribs extending from a location adjacent to said annular discharge and along said first side middle area to a first elbow to inlet pipe transition area and a second set of ribs extending from adjacent to said annular discharge and along said second side middle area to a second elbow to inlet pipe transition area.

7. A gas turbine plant arrangement in accordance with claim 5, wherein said height of said ribs is about 10% of a height of said gas ring channel.

* * * * *

UNITED STATES PATENT AND TRADEMARK OFFICE

CERTIFICATE OF CORRECTION

PATENT NO. : 6,996,992 B2
DATED : February 14, 2006
INVENTOR(S) : Jeske et al.

It is certified that error appears in the above-identified patent and that said Letters Patent is hereby corrected as shown below:

Title page,
Item [73], Assignee, should read -- MAN TURBO AG --.

Signed and Sealed this

Twenty-fifth Day of April, 2006

JON W. DUDAS
*Director of the United States Patent and Trademark Office*